US006388978B1

(12) United States Patent
Ogawa et al.

(10) Patent No.: US 6,388,978 B1
(45) Date of Patent: May 14, 2002

(54) OPTICAL RECORDING METHOD FOR A REWRITABLE PHASE-CHANGE OPTICAL RECORDING MEDIUM

(75) Inventors: Ippei Ogawa; Katsuyuki Yamada; Eiji Noda; Yuki Nakamura; Kenichi Aihara, all of Shizuoka; Hiroko Iwasaki, Tokyo, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/270,108

(22) Filed: Mar. 16, 1999

(30) Foreign Application Priority Data

Apr. 16, 1998 (JP) .......................................... 10-106598
Sep. 17, 1998 (JP) .......................................... 10-263301

(51) Int. Cl.[7] ................................................. G11B 7/00
(52) U.S. Cl. .................................... 369/116; 475/47.52
(58) Field of Search ........................... 369/116, 50, 32, 369/120, 121, 47.5, 47.52

(56) References Cited

U.S. PATENT DOCUMENTS

| 5,276,670 A | 1/1994 | Nogami et al. | |
| 5,298,305 A | 3/1994 | Shinozuka et al. | |
| 5,646,924 A | 7/1997 | Nonoyama et al. | |
| 5,740,149 A | 4/1998 | Iwasaki et al. | |
| 5,761,179 A | 6/1998 | Iwasaki et al. | |
| 5,790,505 A | 8/1998 | Abe et al. | |
| 5,841,747 A | * 11/1998 | Kubota et al. | 369/116 |
| 5,848,043 A | * 12/1998 | Takada et al. | 369/116 |

FOREIGN PATENT DOCUMENTS

| JP | 60-177446 | 11/1985 |
| JP | 61-219692 | 9/1986 |
| JP | 61-270190 | 11/1986 |
| JP | 63-228433 | 9/1988 |
| JP | 63-251290 | 10/1988 |
| JP | 1-277338 | 11/1989 |
| JP | 4-016383 | 1/1992 |
| JP | 4-52189 | 2/1992 |
| JP | 4-052188 | 2/1992 |
| JP | 4-0778031 | 3/1992 |
| JP | 4-123551 | 4/1992 |
| JP | 62-19490 | 9/1994 |
| JP | 62-73438 | 9/1994 |

OTHER PUBLICATIONS

K. Furuya, et al., "Disk structure and composition of Ge–Te–Sb recording film suitable for low linear velocity", Fourth phase change recording study symposium preceding, 70 (1992), p.70–75.
S. Jinno, et al., "Erasable Phase Change Optical Disks for Recording at Low Linear Velocity", Fourth phase change recording study symposium preceding, 76 (1992), p.76–81.
Y. Kawanishi, et al., "Write, Read, and Erase Characteristics of InSe Phase Change CD", Fourth phase change recording study symposium preceding, 82 (1992), p.82–86.

(List continued on next page.)

Primary Examiner—Nabil Hindi
(74) Attorney, Agent, or Firm—Dickstein Shapiro Morin & Oshinsky LLP

(57) ABSTRACT

Both a low-linear-velocity recording and a high-linear-velocity recording can be effectively performed by an optical recording method for recording information on a phase-change optical recording medium which is recordable at a low linear velocity and a high linear velocity greater than the low linear velocity. A ratio (Pel/Pwl) of an erasing power Pel to a recording power Pwl in the low-linear-velocity recording and a ratio (Peh/Pwh) of an erasing power Peh to a recording power Pwh in the high-linear-velocity recording are determined so that the ratio (Pel/Pwl) and the ratio (Peh/Pwh) satisfy the relationship {(Pel/Pwl)<(Peh/Pwh)}.

13 Claims, 8 Drawing Sheets

OTHER PUBLICATIONS

T. Handa, et al., "In–Ag–Te–Sb Phase Change Recording Media at Compact Disk Linear Velocity", Jpn. J. Appl. Phys., vol. 32 (1993), p.5226–5229.

S. Maita, et al. "Erasable Phase Change Optical Disks for Recording at Low Linear Velocity (II)", Fifth phase change recording study symposium preceding, 9 (1993), p.9–10.

J. Tominaga, et al., "Overwrite Properties of V doped In–Ag–Te–Sb Optical Phase Change Media at CD Velocity", Fifth phase change recording study symposium preceding, 5 (1993), p.5–8.

H. Iwasaki, et al., "Completely Erasable Phase Change Optical Disk", Jpn. J. Appl. Pys., vol. 31 (1992), p.461–465.

Y. Ide, et al., "Completely Erasable Phase Change Optical Disk", Third phase change recording study symposium preceding, 102 (1991), p.102–108.

H. Iwasaki, et al., "Completely Erasable Phase Change Optical Disc II: Application of Ag–In–Sb–Te Mixed–Phase System for Rewritable Compact Disc Compatible with CD–Velocity and Double CD–Velocity", Jpn. J. Appl. Phys., vol. 32 (1993), p.5241–5247.

* cited by examiner

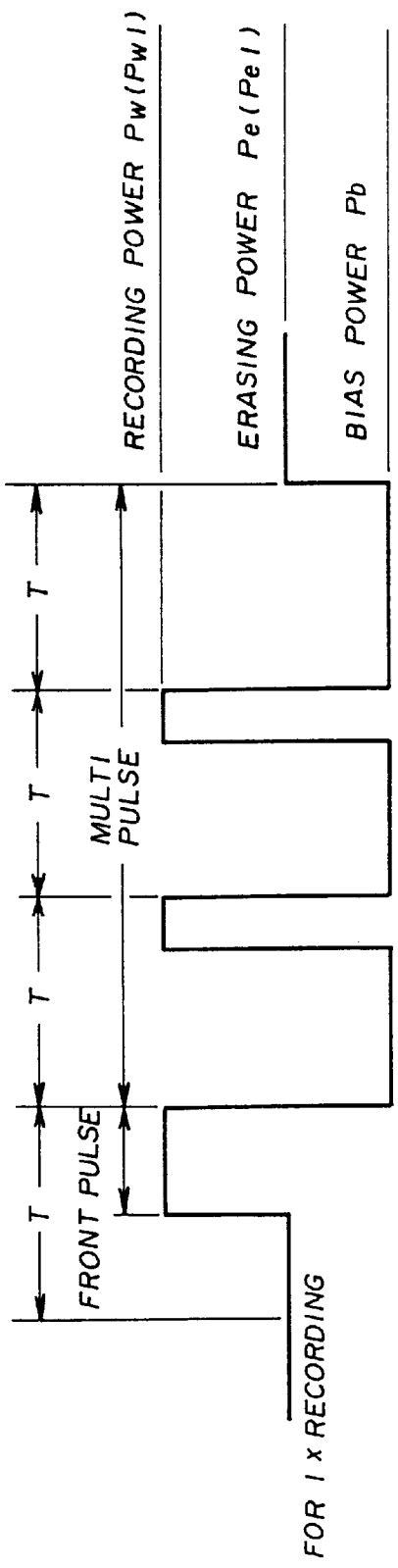
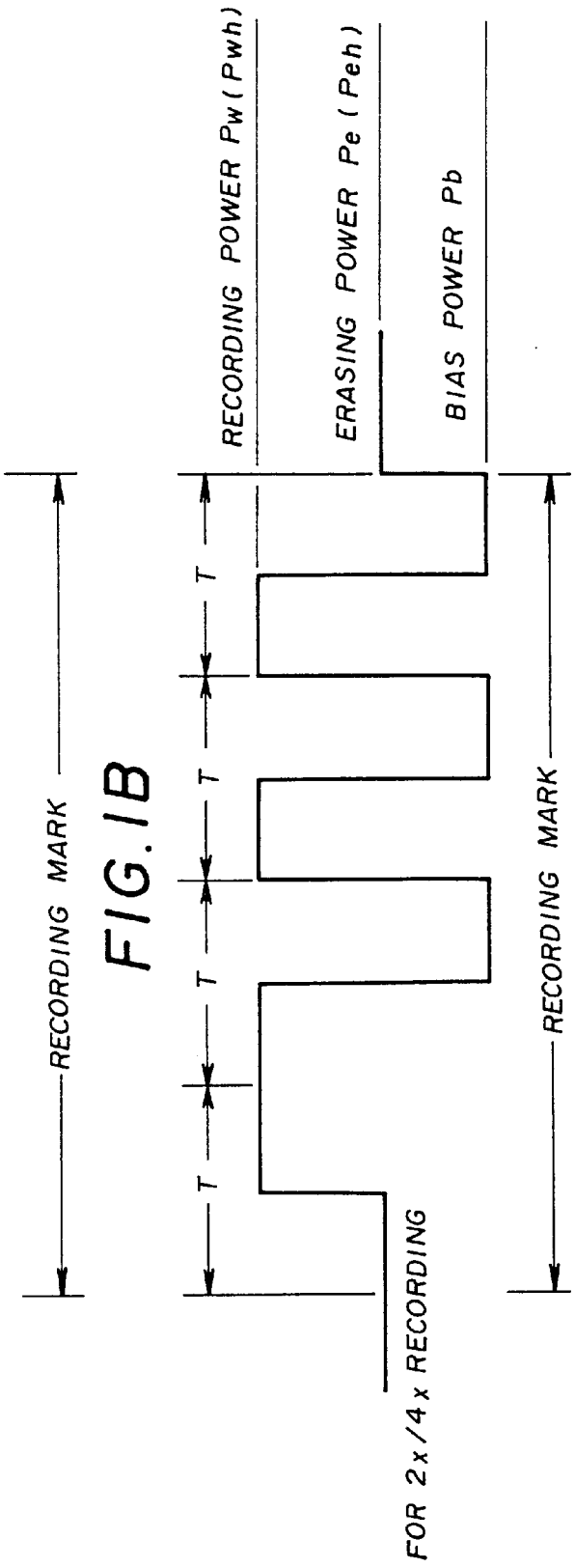

OPTICAL RECORDING METHOD FOR A REWRITABLE PHASE-CHANGE OPTICAL RECORDING MEDIUM

BACKGROUND OF THE INVENTION

1. Field of the Invention

The present invention generally relates to an optical recording method for recording information on an optical recording medium such as a rewritable compact disc (CD-RW) or a rewritable digital video disc (DVD-RW) and, more particularly, to an optical recording method for recording information on a rewritable phase-change optical recording medium by projecting an optical beam onto the rewritable phase-change optical recording medium so as to cause a change of phase in a recording layer of the optical recording medium.

2. Description of the Related Art

A phase-change optical recording medium is known as an optical memory medium onto which information is recorded or information recorded thereon is reproduced or erased by projecting a laser beam onto the optical memory medium. The phase-change optical recording medium utilizes a transformation between a crystal phase and a noncrystal phase or between a crystal phase and a different crystal phase. Development of the phase-change optical recording medium has become active since information recorded on the phase-change optical recording medium can be overwritten by using a single laser beam and an optical system of a drive unit can be a relatively simple structure.

A typical phase-change optical recording medium is disclosed in U.S. Pat. No. 3,530,441. The phase-change optical recording medium disclosed in this patent document is made of a so-called chalcogenic alloy such as Ge—Te, Ge—Te—Sn, Ge—Te—S, Ge—Se—Sb, Ge-As—Se, In—Te, Se—Te or Se—As. Each of Japanese Laid-Open Patent Applications No. 61-219692, No. 61-270190 and No. 62-19490 suggests a material in which Au and Sn or Au and Pd are added to a Ge—Te alloy for improving a stability and a high-speed crystalization of the material. Additionally, each of Japanese Laid-Open Patent Applications No. 62-73438 and No. 63-228433 suggests a Ge—Te—Se—Sb material or a Ge—Te—Sb material having a composition ratio which is specifically defined for improving a repetition characteristic of recordings and erasures. However, none of the materials suggested in the above-mentioned patent documents can satisfy all of the characteristics required for a rewritable phase-change optical recording medium. An important issues to be solved are 1) improvement in recording sensitivity and erasing sensitivity, 2) prevention of decrease in an erasure ratio due to incomplete erasure during an overwriting operation and 3) extension of a service life of a recordable part and a nonrecordable part.

Additionally, Japanese Laid-Open Patent Application No. 63-251290 suggests a recording medium provided with a recording layer comprising a single, multi-state composite layer of which crystal state can be substantially more than three different states. Such a multi-state composite layer which can be more than three different states is defined as a composite layer which includes more than 90 atomic percentage of a composite material (for example, $In_3SbTe_2$) having a chemical composite of more than three states. By using such a recording layer, a recording and erasing characteristic may be improved. However, there still exist problems in that an erasure ratio is small and a laser power used for recording and erasure is not sufficiently reduced.

Further, Japanese Laid-Open Patent Application No. 1-277338 suggests an optical recording medium having a recording layer made of an alloy having a composite represented by $(Sb_aTe_{1-a})_{1-y}M_y$, where $0.4 \leq a \leq 0.7$, $y \leq =0.2$ and M is at least one element selected from a group consisting of Ag, Al, As, Au, Bi, Cu, Ga, Ge, In, Pb, Pt, Se, Si, Sn and Zn. The basic material of this system is $Sb_2Te_3$. A high-speed erasure characteristic and a repetition characteristic are improved by providing an excessive amount of Sb, and the high-speed erasure characteristic is promoted by adding the element M. Additionally, it is explained that a large erasure ratio by a DC light can be achieved. However, this patent document does not teach an erasure ratio during an overwriting operation, and a recording sensitivity is insufficient.

Additionally, Japanese Laid-Open Patent Application No. 60-177446 suggests an optical recording medium including a recording layer made of an alloy having a composite represented by $(In_{1-x}Sb_x)_{1-y}M_y$, where $0.4 \leq a \leq 0.7$, $y \leq 0.2$ and M is at least one element selected from a group consisting of Au, Ag, Cu, Pd, Pt, Al, Si, Ge, Ga, Sn, Te, Se and Pi. Japanese Laid-Open Patent Application No. 63-228433 teaches a Ge—Te—$Sb_2Te_3$—Sb(excessive) alloy used for a recording layer. However, the recording layer disclosed in each of the above-mentioned two patent documents does not satisfy a sensitivity characteristic and an erasure ratio.

Further, Japanese Laid-Open Patent Application No. 4-16383 discloses an optical recording medium provided with a recording thin film formed of a Te—Ge—Sb alloy containing N. Japanese Laid-Open Patent Application No. 4-52188 discloses an optical recording medium provided with a recording thin film formed of a Te—Ge—Se alloy containing a nitride of at least one of the component elements of the alloy. Japanese Laid-Open Patent Application No. 4-52189 discloses an optical recording medium provided with a recording thin film formed of a Te—Ge—Se alloy which is caused to adsorb N. However, none of the above-mentioned optical recording media can provide sufficient characteristics.

As discussed above, in a conventional optical recording medium, the most important issues to be solved are 1) improvement in recording sensitivity and erasing sensitivity, 2) prevention of decrease in an erasing ratio due to incomplete erasure during an overwriting operation and 3) extension of a service life of a recordable part and a nonrecordable part.

On the other hand, in association with a rapid spread of a compact disc (CD), a recordable compact disc (CD-R), which is recordable only once, was developed and has become popular. However, the CD-R cannot correct recorded information when a recording operation has failed. Accordingly, the failed disc is not reusable and must be discarded. Thus, it is desirous to develop a rewritable compact disc so as to eliminate such a drawback.

A rewritable compact disc which utilizes a magneto-optical disc has been developed. However such a rewritable compact disc has drawbacks in that an overwriting operation is difficult to perform and there is no compatibility with a CD-ROM and a CD-R. Accordingly, instead of the rewritable compact disc utilizing a magneto-optical disc, development of a phase-change optical disc has become active.

The following technical documents are related to a rewritable compact disc utilizing a phase-change optical disc:

1) Fourth phase change recording study symposium preceding, 70 (1992), K. Furuya et al., "Disk structure and composition of Ge—Te—Sb recording film suitable for low linear velocity"

2) Fourth phase change recording study symposium preceding., 76 (1992), S. Jinno et al., "Erasable Phase Change Optical Disks for Recording at Low linear Velocity"

3) Fourth phase change recording study symposium preceding, 82 (1992), Y. Kawanishi et al., "Write, Read and Erase Characteristic of InSe Phase Change CD"

4) Jpn. J. Appl. Phys., 32 (1993), T. Handa et al.

5) Fifth phase change recording study symposium preceding, 9 (1993), S. Maita et al., "Erasable Phase Change Optical Disks"

6) Fifth phase change recording study symposium preceding, 5 (1993), J. Tominaga et al., "Overwrite Properties of V doped In—Ag—Te—Sb Optical Phase Change Media at CD Velocity"

However, none of the phase-change optical discs satisfies the desirous characteristics such as compatibility with a CD-ROM and a CD-R, a recording and erasing performance, a recording sensitivity, a number of times of repetition of overwriting, a number of times of reproduction, a stability for storage or a total performance. The drawbacks are mainly caused by a small erasure ratio due to a composition and structure of a material of the optical disc.

Accordingly, it is desirous to develop a phase-change recording material which is suitable for a high-speed recording and erasure. Additionally, it is desirous to develop a rewritable phase-change compact disc having a high performance.

The inventors have suggested an AgInSbTe recording material to be used as a new material that eliminates the above-mentioned drawbacks. A typical material suggested by the inventors is disclosed in the following technical documents:

1) Japanese Laid-Open Patent Application No. 4-78031

2) Japanese Laid-Open Patent Application No. 4-123551

3) Jpn. J. Appl. Physics., 31 (1992), H. Iwasaki et al.

4) Third phase change recording study symposium preceding, 102 (1991), Y. Ide et al., "Completely Erasable Phase Change Optical Disk"

5) Jpn. J. Appl. Physics., 32 (1993), 5242

Additionally, a standard for specifying a rewritable compact disc, which standard may be widely used in this field, was issued in October, 1996. Hereinafter, this standard may be referred to as a conventional standard.

The above-mentioned conventional standard is related to a CD-RW for a linear velocity recording of a double speed (2×) (2.4 to 2.8 m/s). However, in such a low-speed recording, a recording time is long. Thus, it is desirous to develop a rewritable compact disc suitable for a high-speed recording. On the other hand, the CD-RW is expected to be used as an audio disc that is driven at a normal speed (1×). Accordingly, it is desirous that a single CD-RW be used for a multi-speed recording at a double speed (2×) and a four-times (4×) speed, and for a recording at the normal speed (1×).

In a phase-change optical recording medium to which a constant angular velocity (CAV) recording and reproducing method is, applied, such as a DVD-RAM or a DVD-RW, a recording Linear velocity at an outer portion of the disc may be more than two times as fast as a recording linear velocity at an inner portion of the disc. The optical recording medium is preferably formed with a uniform layered-structure and a uniform substrate structure from an innermost portion to an outermost portion. That is, it is desirous that a single optical recording medium be used for a multi-speed recording including a normal speed (1×), a double speed (2×) and a four-times speed (4×).

According to the above-mentioned technologies, it is considered that a phase-change optical recording medium having an extremely superior performance can be achieved by using an AgInSbTe recording material for a recording layer. However, in order to increase a range of an effective linear velocity for recording and satisfy a desired total performance so as to create a new rewritable optical disc market, an improvement in the recording technique (optical recording method) is required as well as development of a material used for a phase-change optical recording medium.

SUMMARY OF THE INVENTION

It is a general object of the present invention to provide an improved and useful optical recording method in which the above-mentioned problems are eliminated.

A more specific object of the present invention is to provide an optical recording method suitable for a phase-change optical recording medium which can have information recorded thereon by a multi-speed recording, in which method both a low-linear-velocity recording and a high-linear-velocity recording can be effectively performed.

In order to achieve the above-mentioned objects, there is provided according to the present invention an optical recording method for recording information on a phase-change optical recording medium which is recordable at a low linear velocity and a high linear velocity greater than the low linear velocity, the optical recording method comprising the steps of:

determining a ratio (Pel/Pwl) of an erasing power Pel to a recording power Pwl in the low-linear-velocity recording and a ratio (Peh/Pwh) of an erasing power Peh to a recording power Pwh in the high-linear-velocity recording so that the ratio (Pel/Pwl) and the ratio (Peh/Pwh) satisfy the relationship {(Pel/Pwl)< (Peh/Pwh)}; and recording information on the phase-change optical recording medium and/or erasing information recorded on the phase-change optical recording medium by causing a change of phase in a recording layer of the phase-change optical recording medium by projecting a light beam onto the phase-change optical recording medium according to the recording power and the erasing power determined in the determining step.

According to the present invention, the ratio of the erasing power Pel to the recording power Pwl in the low-linear-velocity recording is rendered to be smaller than the ratio of the erasing power Peh to the recording power Pwh in the high-linear-velocity recording. Accordingly, a residual heat generated by application of the erasing power in the low-linear-velocity recording is reduced, which results in recording of an appropriate recording mark. As a result, a signal characteristic of a reproduction signal in the low-linear-velocity recording is improved. Additionally, since an excessive laser power is not applied to the recording layer, the overwrite characteristic of the optical recording medium can be well-maintained or even improved.

Preferably, the ratio (Pel/Pwl) and the ratio (Peh/Pwh) satisfy the relationship {(Pel/Pwl)=A×Peh/Pwh)}, where A≦0.9.

Additionally, the ratio (Pel/Pwl) and the ratio (Peh/Pwh) may satisfy the relationship {(Pel/Pwl)=B×(Peh/Pwh)}, where B≧0.45.

Further, the optical recording method according to the present invention may further include the step of setting an Asymmetry (Asym) in the low-linear-velocity recording and in the high-linear-velocity recording so that the Asymmetry (Asyml) in the low-linear-velocity recording and the Asymmetry (Asymh) in the high-linear-velocity recording satisfy the relationship (Asyml<Asymh), where the Asymmetry (Asym) is a characteristic value defined by the following equation;

$$\mathrm{Asym}=[(3T_H+3T_L)/2-(11T_H+11T_L)/2]+(11T_H-11T_L)$$

where $3T_H$ is a maximum value of an amplitude of a reproduction signal obtained from a shortest recording mark, $3T_L$ is a minimum value of an amplitude of the reproduction signal obtained from the shortest recording mark, $11T_H$ is a maximum value of an amplitude of a reproduction signal obtained from a longest recording mark, $11T_L$ is a minimum value of an amplitude of the reproduction signal obtained from the longest recording mark.

According to this invention, a recording mark having an appropriate shape can be recorded in the low-linear-velocity recording. As a result, a signal characteristic of a reproduction signal in the low-linear-velocity recording is improved.

In the above-mentioned invention, the symmetry (Asyml) in the low-linear-velocity recording preferably satisfies the relationship (Asyml≦-3.0).

Additionally, the optical recording method according to the present invention may further include the step of further determining the erasing power Pel and the recording power Pwl in the low-linear-velocity recording and the erasing power Peh and the recording power Pwh in the high-linear-velocity recording so that a difference (Pwl-Pel) and a difference (Pwh-Peh) satisfy the relationship {(Pwl-Pel)>(Pwh-Peh)}.

According to this invention, a cooling effect for a recording mark is increased, and, thereby, an appropriate recording mark can be recorded on the optical recording medium.

In this invention, preferably, the difference (Pwl-Pel) and the difference (Pwh-Peh) satisfy the relationship {(Pwl-Pel)=C×(Pwh—Peh)}, where C≧1.1.

Additionally, the difference (Pwl-Pel) may be set to be equal to or greater than 7.2 mW.

In the optical recording method according to the present invention, a residual heat adjusting pulse may be provided for applying a residual heat adjusting power smaller than the erasing power Pel in the low-linear-velocity recording, the residual heat adjusting pulse preceding a front pulse according to a recording strategy for applying the recording power Pwl so as to record a recording mark.

Accordingly, in the low-linear-velocity recording, a residual heat in the vicinity of the start point can be removed by providing the residual heat adjusting pulse. Thus, an appropriate recording mark can be recorded on the optical recording medium in the low-linear-velocity recording.

Additionally, in the optical recording method according to the present invention, a recording layer of the phase-change optical recording medium may contain elements Ag, In, St, Te and N or 0, and respective composition ratios α, β, γ, δ and ε of the elements may satisfy the following relationships:

0<α≦6, 3≦β≦15, 50≦γ≦65,

20≦δ≦35, 0≦ε10

α+β+γ+δ+ε≦100

Further, in the optical recording method according to the present invention, the low linear velocity may be set to 1.2 m/s to 1.4 m/s, and the high linear velocity may be set equal to or more than 2.4 m/s.

Other objects, features and advantages of the present invention will become more apparent from the following detailed description when read in conjunction with the accompanying drawings.

BRIEF DESCRIPTION OF THE DRAWINGS

FIG. 1A is an illustration for explaining a recording strategy for a normal-speed (1×) recording;

FIG. 1B is an illustration for explaining a recording strategy for a double/four-times speed (2×/4×) recording;

DETAILED DESCRIPTION OF THE PREFERRED EMBODIMENTS

Figure 2:
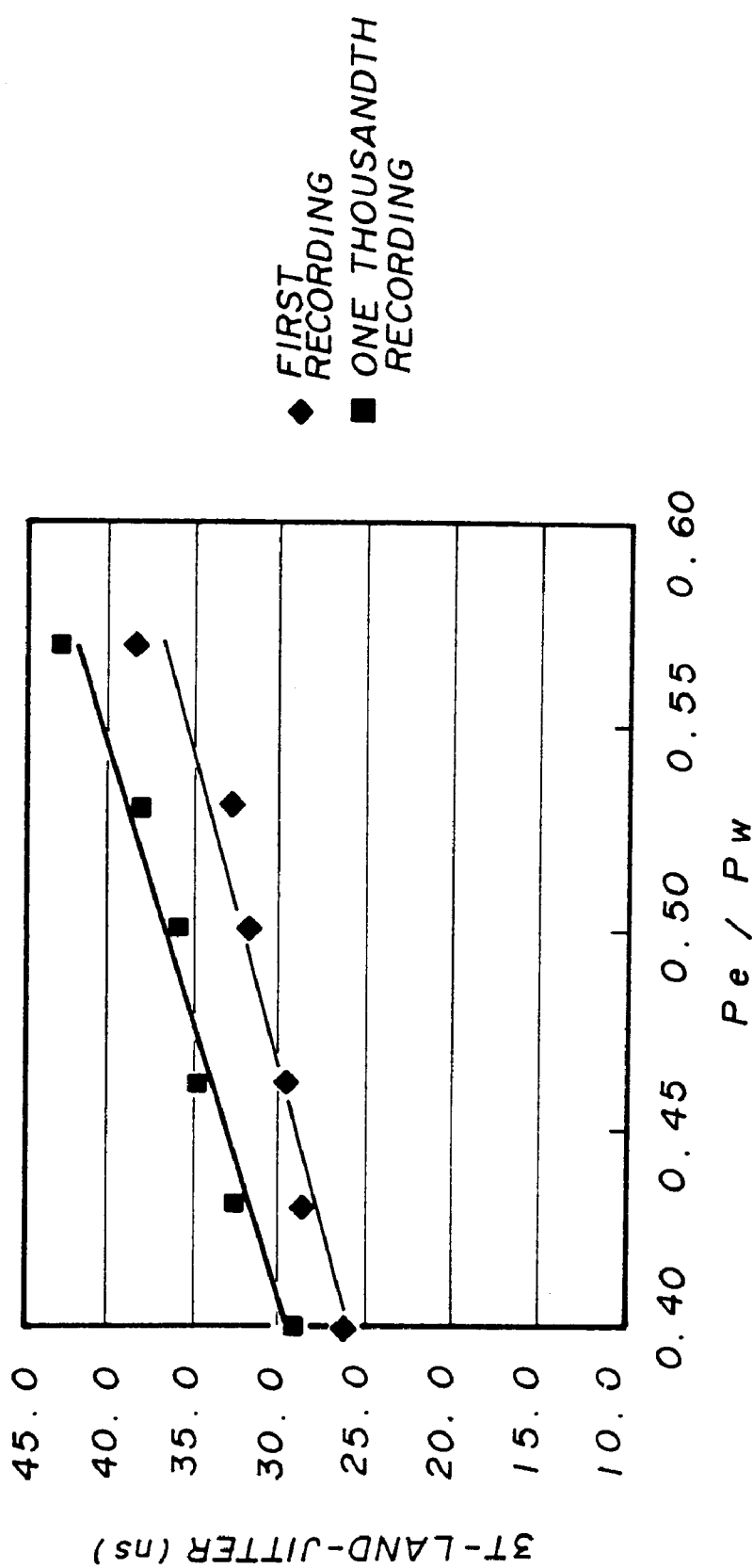
FIG. 2 is a graph showing a relationship between a ratio Pe/Pw and a 3T-land-jitter in a low-linear-velocity (1×) recording.

The present invention relates to an optical recording method suitable for a phase-change optical recording medium to which a multi-speed recording is applicable. The recording operation for the phase-change optical recording medium is performed by projecting a light beam onto the optical recording medium so as to cause a change of phase in a material forming a recording layer of the optical recording medium. In the multi-speed recording, a recording operation and an erasing operation can be performed at more than two different recording linear velocities (for example, a low-linear-velocity recording and a high-linear-velocity recording).

Generally, recording and erasure for the phase-change optical recording medium is achieved by utilizing a change of phase in a recording layer, that is, a phase change between an amorphous state caused by rapid cooling after projection of a light beam and a crystal state caused by gradual cooling after projection of a light beam. Accordingly, in order to enable the multi-speed recording, substantially the same rapid cooling and gradual cooling after melting a part of a recording layer must be achieved at different recording linear velocities.

Generally, in a low-linear-velocity recording, the gradual cooling (change to a crystal state) can be easily performed due to residual heat existing in the vicinity of the melted part. However, it is difficult to achieve the rapid cooling (change to an amorphous state). On the contrary, in a high-linear-velocity recording, it is easy to achieve the rapid cooling, but difficult to achieve the gradual cooling.

Accordingly, the present invention is designed to provide an effective recording method for a low-linear-velocity recording by effectively performing the rapid cooling of c melted part of a recording layer.

A description will now be given of a recording method according to the present invention, which recording method is a multi-speed recording method applied to a CD-RW. The recording speed according to the multi-speed recording method includes a normal speed (1×), a double speed (2×) and a four-times speed (4×). It should be noted that a similar optical recording method is applicable to a phase-change optical recording medium to which a multi-speed recording using other speeds is applicable.

In the present invention, a recording is performed at a low linear velocity and a high liner velocity. The high linear velocity is more than 1.2 times the low linear velocity. For example, in the case of a CD-RW to which a 1×/2×/4× multi-speed recording can be applied, the low-linear-velocity may be set to 1× (linear velocity of 1.2 to 1.4 m/s) and the high-linear-velocity may be set to 2× (linear velocity of 2.4 to 2.8 m/s) and/or 4× (linear velocity of 4.8 to 5.6 m/s). If the low-linear-velocity is set to 2× (linear velocity of 2.4 to 2.8 m/s), the high linear velocity is set to 4× (linear velocity of 4.8 to 5.6 m/s).

Additionally, in the case of a CD-RW using a 2×/4×/8× multi-speed recording, the low linear velocity may be set to 2× (linear velocity of 2.4 to 2.8 m/s) and the high linear velocity may be set to 4× (linear velocity of 4.8 to 5.6 m/s) and/or 8× (linear velocity of 9.6 to 11.2 m/s). If the low linear velocity is set to 4× (linear velocity of 4.8 to 5.6 m/s), the high linear velocity is set to 8× (linear velocity of 9.6 to 11.2 m/s).

As for a recording layer of a phase-change CD-RW to which the optical recording method according to the present invention is applied, a four-state material containing Ag, In, Sb and Te is used as a main component. Such a material is suitable for a phase-change recording material since sensitivity and speed for recording (amorphous), sensitivity and speed for erasure (crystalization) and an erasure ratio are extremely good. However, there is an optimum recording linear velocity according to its composition ratio. Accordingly, in order to use the AgInSbTe recording material with a multi-speed recording, a composition ratio of the AgInSbTe recording material and an optical recording method applied thereto must be adjusted in accordance with a range of a linear velocity to be used.

A signal recorded and reproduced for evaluation was a random EFM (Eight to Fourteen Modulation) signal which is recorded by using a recording pulse strategy conforming to the above-mentioned conventional standard. FIG. 1A shows a recording pulse strategy for a normal-speed (1×) recording when a 4T-mark recording is performed, that is, when a mark having a length greater than four times that of a reference period T is recorded. FIG. 1B shows a recording pulse strategy for a double/four-times speed (2×/4×) recording when the 4T-mark recording is performed.

Reproduction and evaluation of the recorded signal were performed by a laser beam having a reproducing power of 1 mW. A recording power Pw was set to be an optimum recording power which was obtained in accordance with a recording power obtained by an optimum power control (OPC). The OPC is a method for calculating a recording power specified in the above-mentioned conventional standard for a CD-RW.

The following table 1 shows a signal characteristic for each linear-velocity recording for a CD-RW to which the 1×/2×/4× multi-speed recording is applicable. A 3T-land-jitter, which represents a quality of a recorded signal, was less than 35 ns according to the standard for a CD-RW. However, considering conformability to various drives, it is preferable that the 3T-land-jitter be 30 ns. The 3T-land-jitter is less than 25 ns in the 2× and 4× linear-velocity recordings. This indicates that a good quality signal is recorded. However, the 3T-land-jitter shows a value greater than 30 ns in the low-linear-velocity (1×) recording. Accordingly, the 3T-land-jitter is improved by the optical recording method according to the present invention so as to improve a signal characteristic in the low-linear-velocity (1×) recording.

TABLE 1

| Linear Velocity | Pe/Pw | Optimum Power | 3T-land-jitter | Asymmetry |
|---|---|---|---|---|
| 1× write | 0.5 | 13.1 | 32.0 | −0.9 |
| 2× write | 0.5 | 13.3 | 19.6 | −2.3 |
| 4× write | 0.5 | 13.6 | 24.0 | −1.0 |

FIG. 2 is Et graph showing a relationship between a ratio Pe/Pw of an erasing power Pe to a recording power Pw and a 3T-land-jitter in the low-linear-velocity recording. Hereinafter, the erasing power Pe and the recording power Pw in the low-linear-velocity (1×) recording are referred to as Pel and Pwl, respectively. Similarly, the erasing power Pe and the recording power Pw in the high-linear-velocity recording are referred to as Peh and Pwh, respectively.

In FIG. 2, a recording power is 13.0 mW and the numbers of times of recording is 1 and 1,000. The 3T-land-jitter is decreased as a ratio Pel/Pwl is decreased for both the first recording and the one thousandth recording. Accordingly, the ratio Pel/Pwl in the low-linear-velocity (1×) recording is rendered to be smaller than the ratio Peh/Pwh in the high-linear-velocity (2×, 4×) recording. That is, the ratios Pel/Pwl and Peh/Pwh are determined so that the following relationship is satisfied.

Pel/Pwl<Peh/Pwh

Preferably, the ratio Pel/Pwl in the low-linear-velocity (1×) recording is less than 0.9 times the ratio Peh/Pwh in the high-linear-velocity (2×, 4×) recording. That is, it is preferable that the following relationship be satisfied.

Pel/Pwl=A×(Peh/Pwh)

(A≦0.90)

More preferably, the ratio Pel/Pwl is equal to or less than 0.85 times the ratio Peh/Pwh (A≦0.85).

Figure 3:
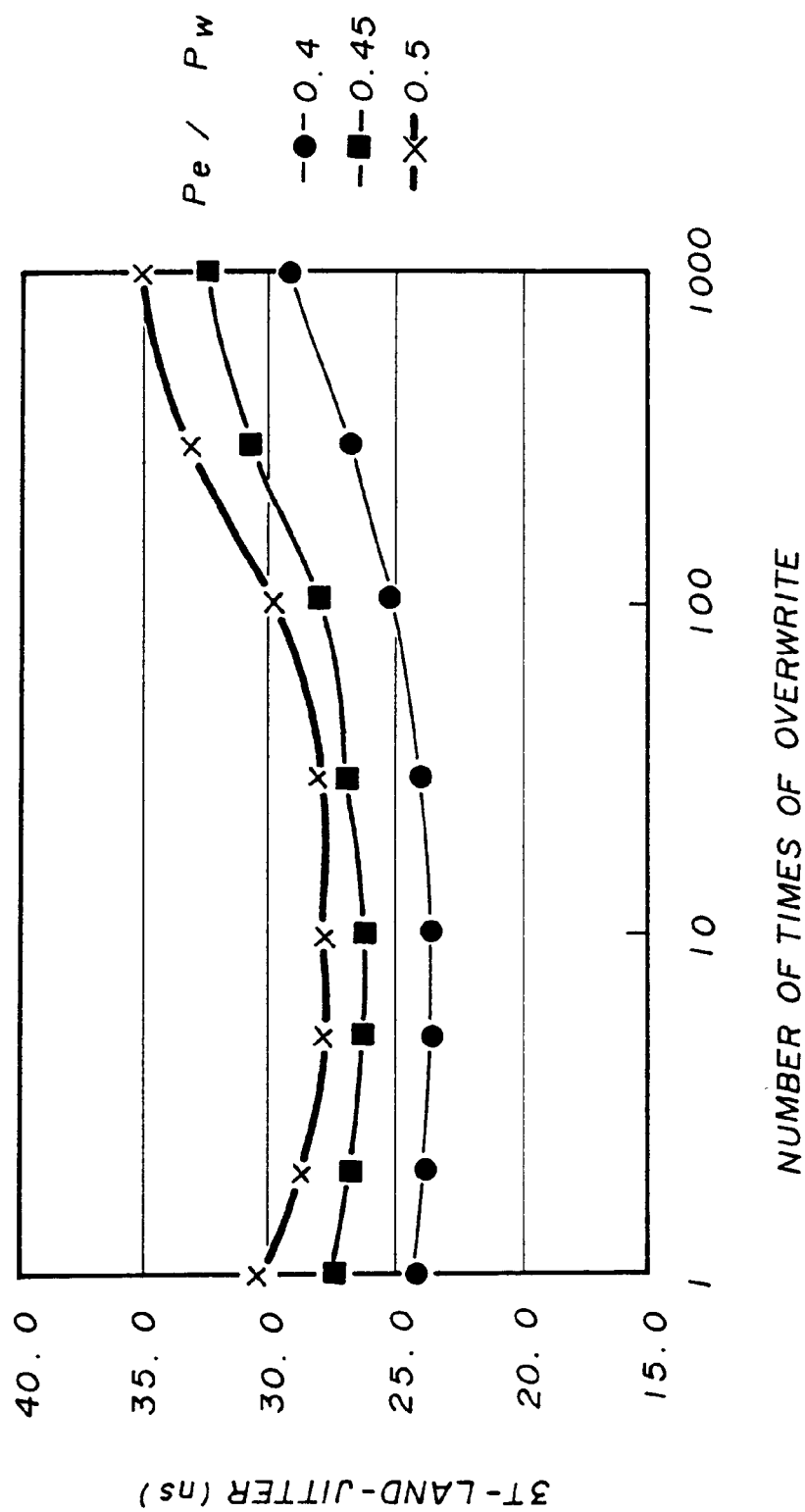
FIG. 3 is a graph showing a relationship between the number of times of an overwrite and a 3T-land-jitter in the low-linear-velocity (1×) recording.

When stability in an overwrite characteristic up to 10 times is considered, the ratio Pel/Pwl is preferably equal to or less than 0.80 times the ratio Peh/Pwh (A≦0.80). FIG. 3 is a graph showing a relationship between the number of times of an overwrite and the 3T-land-jitter in the low-linear-velocity (1×) recording. Apparent from FIG. 3, if the ratio Pel/Pwl is set to a value equal to or less than 0.4 (equal to or less than 0.8 times the ratio Peh/Pwh), a stable signal characteristic can be obtained up to about 10 times of an overwrite.

On the other hand, if the ratio of the erasing power Pe to the recording power Pw is too small, a thermal energy caused by the erasing power Pe cannot reach energy required for melting the material of the recording layer. Accordingly, erasure of a recorded signal is incomplete. As a result, the 3T-land-jitter after an overwrite is increased. Thus, it is preferable that the ratio Pel/Pwl in the low-linear-velocity recording be equal to or greater than 0.45 times the ratio Peh/Pwh in the high-linear-velocity (2x, 4x) recording. That is, it is preferable that the following ratio be satisfied.

Pel/Pwl=Ax(Peh/Pwh)

(A≧0.45)

More preferably, the ratio Pel/Pwl in the low-linear-velocity (1x) recording is equal to or greater than 0.5 times the ratio Peh/Pwh in the high-linear-velocity (2x, 4x) recording (A≧0.5).

As a method for improving a signal characteristic of a first recording, a method for increasing an effect of rapid cooling by increasing the recording power is known. However, since an excessive amount of heat is provided to the recording layer, a local change in a composition of the recording layer may occur while recording and erasure are repeated. This may create a risk of deteriorating an overwrite characteristic. In the optical recording method according to the present invention, since a thermal energy more than an optimum recording power is not applied to the recording layer, as mentioned above, the overwrite characteristic is prevented from being deteriorated.

Figure 4:
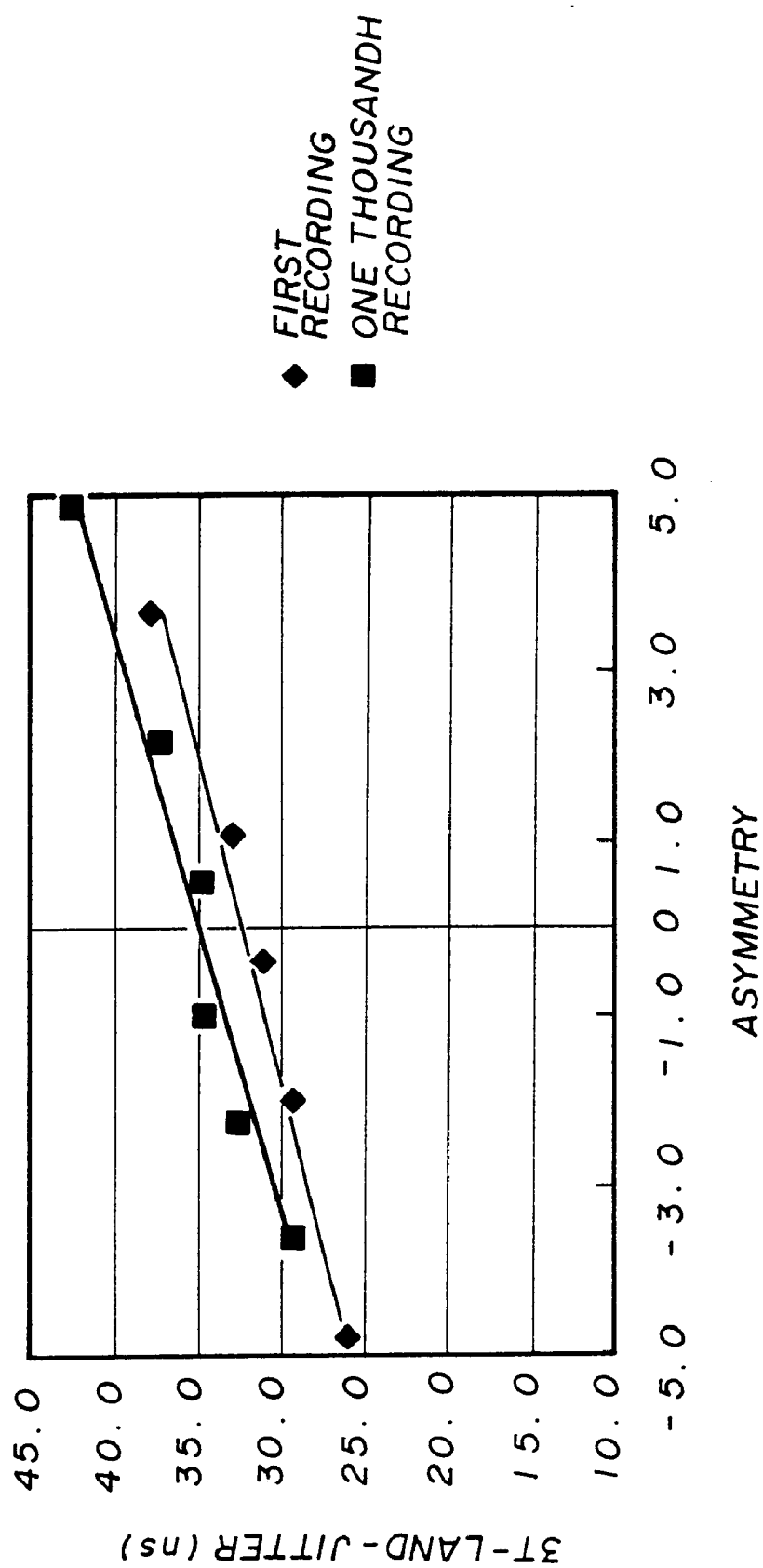
FIG. 4 is a graph showing a relationship between an asymmetry and a 3T-land-jitter in the low-linear-velocity (1×) recording.
Figure 5:
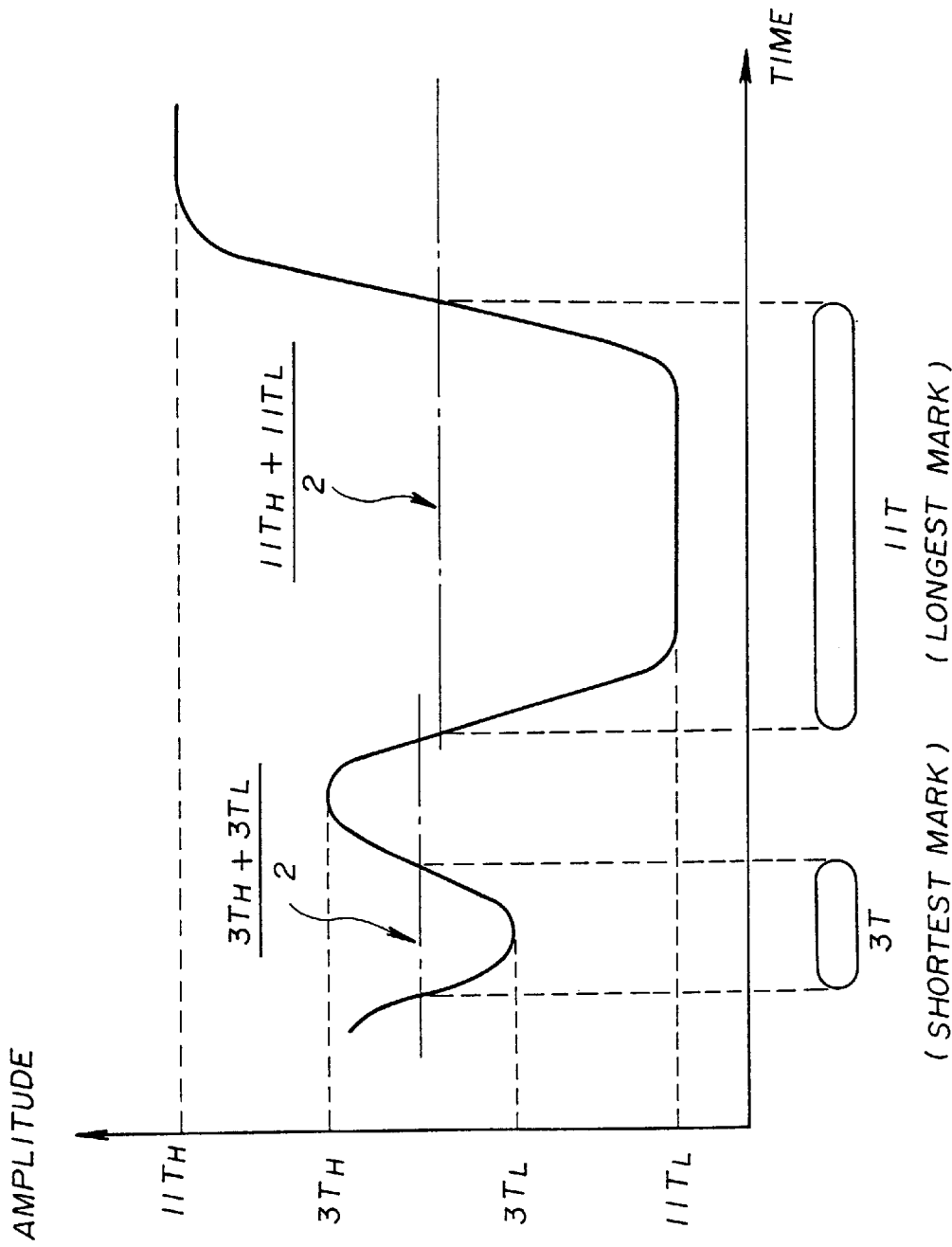
FIG. 5 is a chart for explaining an Asymmetry.

FIG. 4 is a graph showing a relationship between an Asymmetry and a 3T-land-jitter in the low-linear-velocity (1x) recording. The Asymmetry is defined by the above-mentioned conventional standard. FIG. 5 is a chart for explaining the Asymmetry. The Asymmetry is a value that corresponds to an offset of a middle value of a 3T amplitude of a reproduction signal from a middle valve of an 11T amplitude. The Asymmetry (Asym) is represented by the following equation.

Asym=[(3$T_H$+3$i_L$)/2−(11$T_H$+11$T_L$)/2]÷(11$T_H$−11$T_L$)

In FIG. 4, the Asymmetry was controlled by varying the ratio Pe/Pw which is the ratio of the erasing power Pe to the recording power Pw and varying the shape of a laser beam spot. As shown in FIG. 4, values of the 3T-land-jitter for the first recording and one thousandth recording were decreased as the Asymmetry was decreased. The Asymmetry (Asyml) in the low-linear-velocity recording when the 3T-land-jitter was below 30 ns was −2.5. It should be noted that the Asymmetry in the low-linear-velocity recording is referred to as Asyml, and the asymmetry in the high-linear-velocity recording is referred to as Asymh. A preferred Asyml is smaller than the Asymh in the high-linear-velocity (2x, 4x) recording. Considering allowable manufacturing tolerances, the Asyml is preferably be equal to or less than −3 (Asyml ≦−3). More preferably, the Asyml is equal to or less than −4. According to the present invention, the overwrite characteristic at a one-thousandth low-linear-velocity recording shows a 3T-land-jitter of less than 30 ns. Accordingly, the signal characteristic can be improved by controlling the Asymmetry. It should be noted that, as a method for controlling the Asymmetry, there are various methods including a variation in the shape of the recording mark, the shape of the beam spot or the shape of pulses in the recording strategy.

Figure 6:
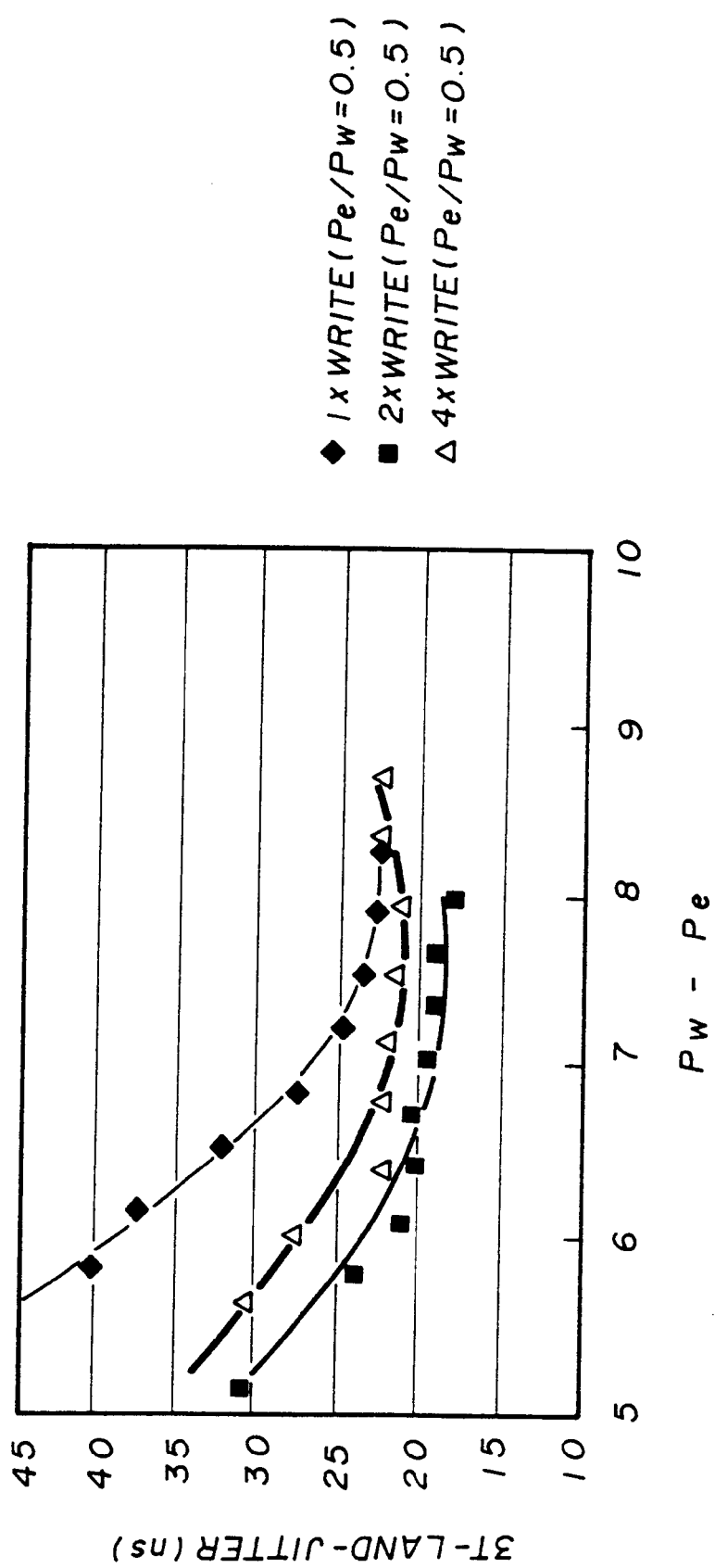
FIG. 6 is a graph showing a relationship between a difference (Pw-Pe) and a 3T-land-jitter in the low-linear-velocity (1×) recording and high-linear-velocity (2×, 4×) recordings.

FIG. 6 is a graph showing a relationship between a difference (Pw−Pe) and a 3T-land-jitter in the low-linear-velocity (1x) recording and high-linear-velocity (2x, 4x) recordings. The recording power was 10 to 16 mW. The ratio Pe/Pw was 0.5. The value of the difference (Pw−Pe) at which the 3T-land-jitter is equal to or less than 30 ns in the low-linear-velocity (1x) recording is greater than that of the high-linear-velocity (2x, 4x) recording. That is, the differ-ence (Pwl−Pel) in the low-linear-velocity (1x) recording is preferably greater than the difference (Pwh−Peh) in the high-linear-velocity (2x, 4x) recording as represented by the following relationship.

(Pwl−Pel)>(Pwh−Peh)

More preferably, the difference (Pwl−Pel) is equal to or greater than 1.1 times the difference (Pwh−Peh) as represented by the following relationship.

(Pwl−Pel)=Bx(Pwh−Peh)

(B≧1.1)

Most preferably, the difference (Pwl−Pel) is equal to or greater than 1,2 times the difference (Pwh−Peh).

On the other hand, a value of the difference (Pwl−Pel) is preferably equal to or greater than 7.2 mW ((Pwl−Pel)≧7.2 mW). More preferably, the value of the difference (Pwl−Pel) is equal to or greater than 7.8 mW. Most preferably, the value of the difference (Pwl−Pel) is equal to or greater than 8.1 mW. The difference (Pwl−Pel) in the low-linear-velocity recording has only a small dependency on the value of the ratio Pel/Pwl. Accordingly, the optical recording method according to the present invention can be applied by considering only the difference (Pwl−Pel) without considering a value of the ratio Pel/Pwl.

Figure 7:
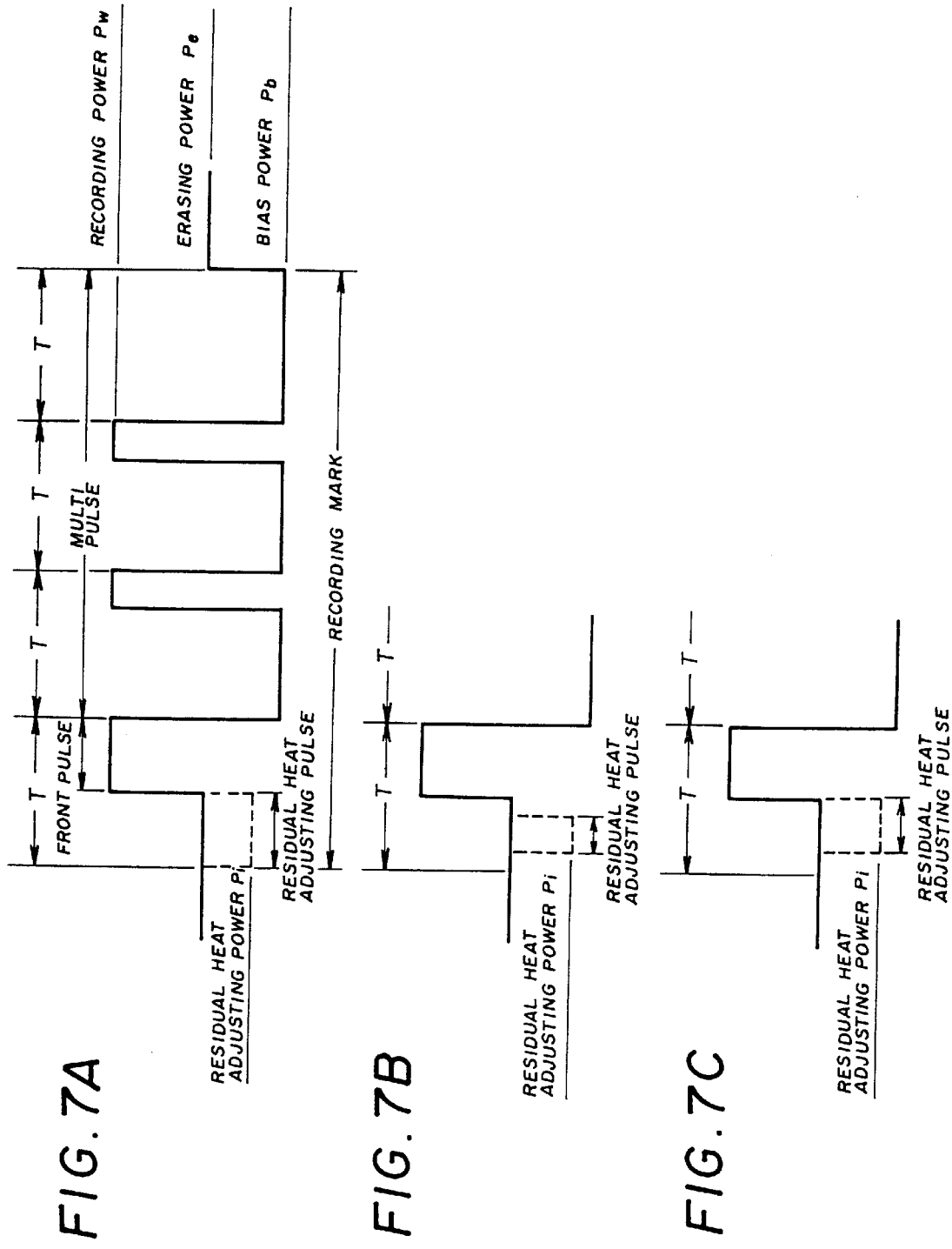
FIG. 7A is an illustration for explaining a recording strategy for a normal-speed (1×) recording used in an optical recording method according to the present invention.
FIGS. 7B and 7C are illustrations of variations of a residual heat adjusting pulse shown in FIG. 7A.

FIG. 7A is an illustration for explaining the recording strategy in the low-linear-velocity (1x) recording. The strategy indicated by solid lines is the same as that indicated in FIG. 1. In FIG. 7A, a strategy according the optical recording method of the present invention is indicated by dashed lines. The feature of the recording strategy according to the optical recording method of the present invention is a residual heat adjusting power Pi being provided immediately before a front pulse in the low-linear-velocity (1x) recording, the residual heat adjusting power Pi being less than an erasing power Pe. It should be noted that FIGS. 7B and 7C show variations of the residual heat adjusting pulse shown in FIG. 7A. By applying the residual heat adjusting pulse, a residual heat in the vicinity of a start point of a recording mark due to an erasing power Pe can be removed. A preferable value of the residual heat adjusting power Pi was equal to or less than ⅔ times the erasing power Pe. More preferably, the residual heat adjusting power Pi was equal to or less than ½ times the erasing power Pe. Alternatively, the bias power Pb may be used for the residual heat adjusting power Pi. Additionally, a start point of the residual heat adjusting pulse for applying the residual heat adjusting power Pi was preferably within a T/2 range from the start point of the front pulse in a forward direction. More preferably, the range is T/4. A width of the residual heat adjusting pulse was preferably equal to or less than T/2. More preferably, the width of the residual heat adjusting pulse was equal to or less than T/4. Most preferably, the start point and the width of the residual heat adjusting pulse were adjusted according to a length 3T to 11T of each of the recording marks. As for a method for determining the start point and the width of the residual heat adjusting pulse that are suitable for each recording mark, there are a method for determining by using a length of the recording mark obtained by an Optical Power Control (OPC) and a method for determining by calculating the length of the recording mark by a reflection intensity of a running OPC.

A description will now be given of a specific example of the optical recording method according to the present invention.

The recording layer of the CD-RW to which the optical recording method according to the present invention was applied contained elements Ag, In, Sb, Te and N or O. The composition ratio of the respective elements were α=4, β=7, γ=58, δ=29 and ε=2.

Figure 8:
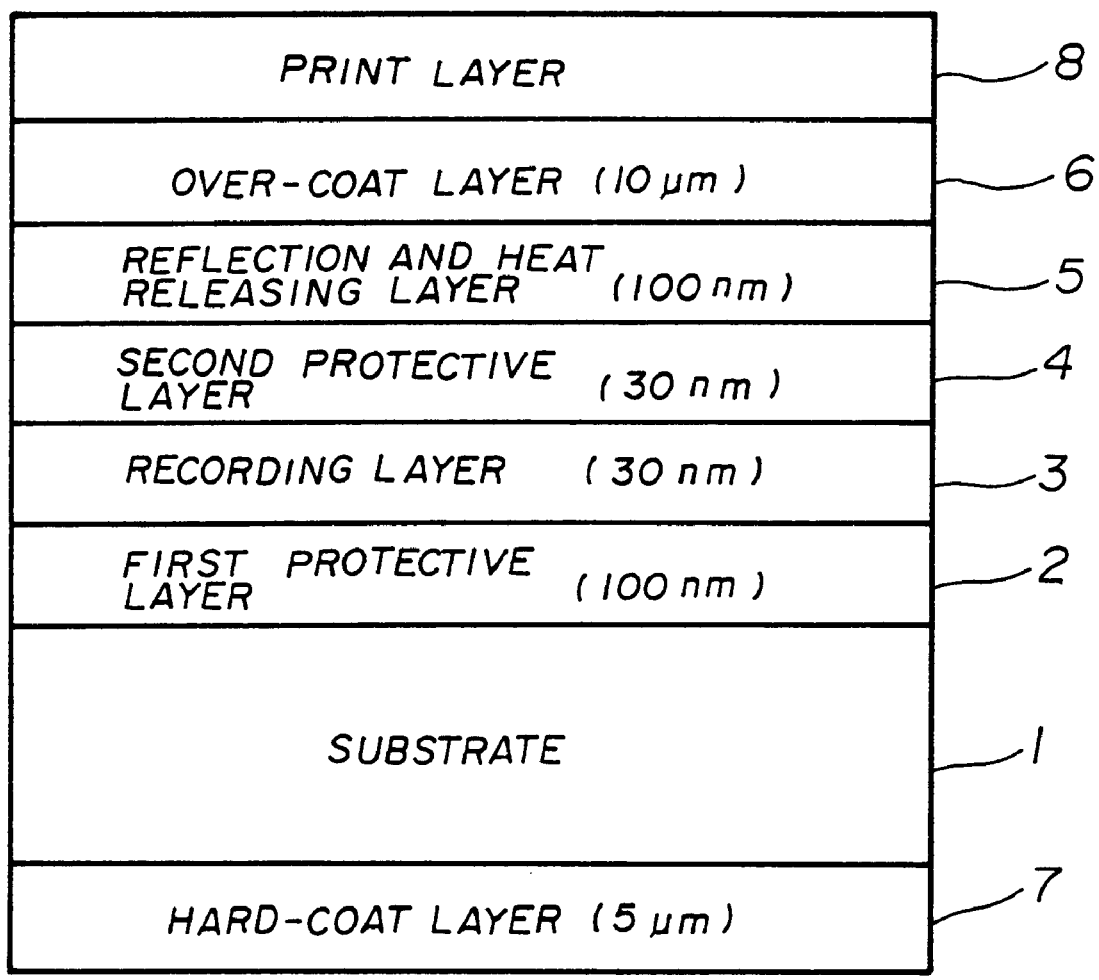
FIG. 8 is an illustration for explaining a layered structure of a phase-change optical recording medium according to the present invention.

A phase-change optical disc (CD-RW) having a layered structure as shown in FIG. 8 was produced. The layered structure included a substrate 1 made of polycarbonate having a thickness of 1.2 mm. The substrate 1 had a groove having a width of 0.5 μm and a depth of 35 nm. A first protective layer 2 having a thickness of 100 nm, a recording layer 3 having a thickness of 30 nm, a second protective layer 4 having a thickness of 30 nm and a reflection and heat releasing layer 5 having a thickness of 100 nm were sequentially formed on the substrate 1 by a spattering apparatus with a tact time of 10 seconds. Then, an over-coat layer 6 having a thickness of 10 μm was formed on the reflection and heat releasing layer 5. Additionally, a hard-coat layer 7 having a thickness of 5 μm was formed on the other side of the substrate 1 by spin coating of an ultraviolet cure resin. The first and second protective layers 2 and 4 were formed by ZnSSiO$_2$. The reflection and heat releasing layer 5 was formed by an aluminum alloy.

The thus-formed optical disc was subjected to a crystallization process for the recording layer 3 by using an initialization apparatus having a large-diameter laser diode (LD). The initializing condition was set so that more than 95% of a saturated reflectance was obtained. Thereafter, a print layer 8 was formed on the over-coat layer 6.

The optical recording method according to the present invention and a conventional linear-velocity (1×) recording were applied to the thus-formed optical disc. Results of Such tests are shown in the following tables. An evaluation was performed by recording a random EFM signal and reproducing the recorded random EFM signal. The recording was performed at the linear velocities of 1×, 2× and 4×. The reproduction was performed at the linear velocity 1×. The wavelength of the laser beam was 780 nm and a reproduction power Pr was 1 mW (Pr=1 mW).

TABLE 2

| | Rec. Speed | N | Pw | Pe/Pw | A | 3T-land-jitter |
|---|---|---|---|---|---|---|
| Ex. 1 | | | | | | |
| | 1× | 1 | 13.1 | 0.40 | 0.80 | 26.1 |
| | 1× | 1000 | 13.1 | 0.40 | 0.80 | 32.6 |
| | 1× | 1 | 13.1 | 0.15 | 0.30 | 24.3 |
| | 1× | 10 | 13.1 | 0.15 | 0.30 | -NM- |
| | 2× | 1 | 13.3 | 0.50 | — | 19.6 |
| | 4× | 1 | 13.6 | 0.50 | — | 24.0 |
| Comp. 1 | | | | | | |
| | 1× | 1 | 13.1 | 0.50 | 1.00 | 32.0 |
| | 1× | 1000 | 13.1 | 0.50 | 1.00 | 34.8 |

N . . . number of times of an overwrite
-NM- . . . not measurable
Pel/Pwl = Ax(Peh/Pwh)

As shown in Table 2, when the ratio Pel/Pwl of the erasing power to the recording power in the 1× recording was rendered to be 0.8 times the ratio Peh/Pwh of the erasing power to the recording power in the 2×/4× recording, the 3T-land-jitter at the first recording was able to be reduced from 32.6 (Comp.1) to 26.1 (Ex.1). Thus, it was recognized that a good signal characteristic was obtained. Additionally, the 3T-land-jitter at the one thousandth recording for the conventional recording method (Comp.1) was reduced from 34.8 to 32.6. Thus, it was recognized that the overwrite characteristic can be also improved. When the ratio Pel/Pwl was reduced to 0.15, the 3T-land-jitter at the first recording was good. However, it was impossible to measure the 3T-land-jitter after an overwrite was performed ten times.

TABLE 3

| | Rec. Speed | N | Pw | Pe/Pw | Beam Shape | Asym | 3T-land-jitter |
|---|---|---|---|---|---|---|---|
| Ex. 2 | | | | | | | |
| | 1× | 1 | 13.1 | 0.4 | R | -5.6 | 24.9 |
| | 1× | 1 | 13.1 | 0.4 | G | -4.8 | 26.1 |
| | 1× | 1 | 13.1 | 0.5 | R | -2.4 | 28.6 |
| | 2× | 1 | 13.3 | 0.5 | G | -2.3 | 19.6 |
| | 4× | 1 | 13.6 | 0.5 | G | -1.0 | 24.0 |
| Comp. 2 | | | | | | | |
| | 1× | 1 | 13.1 | 0.5 | G | -0.9 | 32.0 |

N . . . number of times of an overwrite
R . . . longitudinal direction of beam spot extends in a radial direction of disc
G . . . longitudinal direction of beam spot extends in a direction of groove of disc As shown in Table 3, the 3T-land-jitter was reduced from 32.0 (Comp.2) to 28.6 when the shape of the laser beam spot was changed from an oval having the longer axis extending in a direction of the groove of the optical disc to an oval having the longer axis extending in a radial direction of the optical disc and when the Asymmetry (Asyml) in the 1× recording was reduced to -2.4 which is smaller than the Asymmetry (Asymh) in the 2×/4× recording. Thus, it was recognized that a good signal was obtained. Additionally, when the Asymmetry in the 1× recording was reduced to -5.6 by reducing the ratio Pe/Pw to 0.4, the 3T-land-jitter was further reduced to 24.9 which resulted in a further improved signal being obtained.

TABLE 4

| | Rec. Speed | N | Pw | Pe/Pw | Pw-Pe | 3T-land-jitter |
|---|---|---|---|---|---|---|
| Ex. 3 | | | | | | |
| | 1× | 1 | 13.1 | 0.40 | 7.9 | 26.1 |
| | 1× | 1 | 14.4 | 0.50 | 7.2 | 26.8 |
| | 2× | 1 | 13.3 | 0.50 | 6.7 | 19.6 |
| | 4× | 1 | 13.6 | 0.50 | 6.8 | 24.0 |
| Comp. 3 | | | | | | |
| | 1× | 1 | 13.1 | 0.50 | 6.6 | 32.0 |
| | 1× | 1 | 13.1 | 0.57 | 5.6 | 34.8 |

N . . . number of times of an overwrite

As shown in Table 4, the difference (Pwl-Pel) in the 1× recording was increased to 7.2 mW, which is greater than that in the 2×/4× recording, by increasing the recording power Pw from 13.1 mW to 14.4 mW. As a result, the 3T-land-jitter was reduced from 32.0 (Comp.3) to 26.3 which resulted in a good signal characteristic. Additionally, the ratio Pe/Pw in the 1× recording was reduced to 0.4 so as to increase the difference (Pwl-Pel) to 7.9 mW. As a result, the 3T-land jitter was reduced from 32.0 (Comp.3) to 26.1. This indicates that a good signal characteristic can be obtained by not only reducing the difference (Pwl-Pel) in the low-linear-velocity (1×) recording but also by increasing the difference (Pwl-Pel) in the high-linear-velocity (2×/4×) recording. Additionally, as indicated in the lower line of the Comp.3, it was recognized that the 3T-land-jitter was increased from 32.0 to 34.8 by reducing the difference (Pwh-Peh) from 6.6 to 5.6.

TABLE 5

| | Rec. Speed | N | Pw | Pe/Pw | Strategy | 3T-land-jitter |
|---|---|---|---|---|---|---|
| Ex. 4 | | | | | | |
| | 1x | 1 | 13.1 | 0.50 | C1 | 24.0 |
| | 1x | 1 | 13.1 | 0.50 | C2 | 22.0 |
| | 2x | 1 | 13.3 | 0.50 | B | 19.6 |
| | 4x | 1 | 13.6 | 0.50 | B | 24.0 |
| Comp. 4 | | | | | | |
| | 1x | 1 | 13.1 | 0.50 | A | 32.0 |

N . . . number of times of an overwrite

In the column of Strategy in the above Table 5, the letters A, B, C1 and C2 represent recording strategies as follows.

A . . . 1× recording strategy specified in the conventional Standard.

B . . . 2×/4× recording strategy specified in the conventional Standard.

C1 . . . recording strategy according to the present invention in which:
residual heat adjusting power Pi=Pe/2;
a start point of the residual heat adjusting pulse precedes T/4 from the front pulse; and
a width of the residual heat adjusting pulse is T/4.

C2 . . . recording strategy according to the present invention in which:
residual heat adjusting power Pi=Pb (1 mW);
a start point of the residual heat adjusting pulse precedes T/4 from the front pulse; and
a width of the residual heat adjusting pulse is T/4.

As shown in the Table 5, the 3T-land-jitter was reduced from 32.0, which was obtained according to the recording strategy specified by the conventional standard in the 1× recording, to 24.0 when the signal was recorded by using the recording strategy C1 according to the present invention. Additionally, the 3T-land-jitter was reduced to 22.0 when the signal was recorded by using the recording strategy C2 in which the residual heat adjusting power Pi was reduced to the bias power Pb.

As mentioned above, an optical recording apparatus which records a signal on a phase-change multi-speed optical recording medium in a low-linear-velocity recording can be provided by using an optical recording method according to the present invention.

The present invention is not limited to the specifically disclosed embodiments, and variations and modifications may be made without departing from the scope of the present invention.

The present application is based on the Japanese priority application No. 10-263301 filed on Sep. 17, 1998, entire contents of which are hereby incorporated by reference.

What is claimed is:

1. An optical recording method for recording information on a phase-change optical recording medium which is recordable at a low-linear-velocity and a high-linear-velocity greater than the low-linear-velocity, the optical recording method comprising the steps of:

determining a ratio (Pel/Pwl) of an erasing power Pel to a recording power Pwl in the low-linear-velocity recording and a ratio (Peh/Pwh) of an erasing power Peh to a recording power Pwh in the high-linear-velocity recording so that the ratio (Pel/Pwl) and the ratio (Peh/Pwh) satisfy the relationship {(Pel/Pwl)< (Peh/Pwh)}; and recording information on the phase-change optical recording medium and/or erasing information recorded on the phase-change optical recording medium by projecting a light beam onto the phase-change optical recording medium according to the recording power and the erasing power determined in the determining step; and wherein the determining step includes the step of determining the erasing power Pel and the recording power Pwl in the low-linear-velocity recording and the erasing power Peh and the recording power Pwh in the high-linear-velocity recording so that the ratio (Pel/Pwl) and the ratio (Peh/Pwh) satisfy the relationship {(Pel/Pwl)= A×(Peh/Pwh)}, where A≦0.9.

2. An optical recording method for recording information on a phase-change optical recording medium which is recordable at a low-linear-velocity and a high-linear-velocity greater than the low-linear-velocity, the optical recording method comprising the steps of:

determining a ratio (Pel/Pwl) of an erasing power Pel to a recording power Pwl in the low-linear-velocity recording and a ratio (Peh/Pwh) of an erasing power Peh to a recording power Pwh in the high-linear-velocity recording so that the ratio (Pel/Pwl) and the ratio (Peh/Pwh) satisfy the relationship {(Pel/Pwl)< (Peh/Pwh)}; and recording information on the phase-change optical recording medium and/or erasing information recorded on the phase-change optical recording medium by causing a change of phase in a recording layer of the phase-change optical recording medium by projecting a light beam onto the phase-change optical recording medium according to the recording power and the erasing power determined in the determining step; and wherein the determining step includes the step of determining the erasing power Pel and the recording power Pwl in the low-linear-velocity recording and the erasing power Peh and the recording power Pwh in the high-linear-velocity recording so that the ratio (Pel/Pwl) and the ratio (Peh/Pwh) satisfy the relationship {(Pel/Pwl)= B×(Peh/Pwh)}, where B≧0.45.

3. An optical recording method for recording information on a phase-change optical recording medium which is recordable at a low-linear-velocity and a high-linear-velocity greater than the low-linear-velocity, the optical recording method comprising the steps of:

determining a ratio (Pel/Pwl) of an erasing power Pel to a recording power Pwl in the low-linear-velocity recording and a ratio (Peh/Pwh) of an erasing power Peh to a recording power Pwh in the high-linear-velocity so that the ratio (Pel/Pwl) and the ratio (Peh/ Pwh) satisfy the relationship {(Pel/Pwl)<(Peh/Pwh)};

recording information on the phase-change optical recording medium and/or erasing information recorded on the phase-change optical recording medium by causing a change of phase in a recording layer of the phase-change optical recording medium by projecting a light beam onto the phase-change optical recording medium according to the recording power and the erasing power determined in the determining step; and setting an Asymmetry (Asym) in the low-linear-velocity recording and in the high-linear-velocity recording so that the Asymmetry (Asyml) in the low-linear-velocity recording and the Asymmetry (Asymh) in the high-linear-velocity recording satisfy the relationship (Asyml<Asymh), where the Asymmetry (Asym) is a characteristic value defined by the following equation:

$$\text{Asym}=[(3T_H+3T_L)/2-(11T_H+11T_L)/2]\div(11T_H-11T_L)$$

where $3T_H$ is a maximum value of an amplitude of a reproduction signal obtained from a shortest recording mark, $3T_L$ is a minimum value of an amplitude of the reproduction signal obtained from the shortest recording mark, $11T_H$ is a maximum value of an amplitude of a reproduction signal obtained from a longest recording mark, $11T_L$ is a minimum value of an amplitude of the reproduction signal obtained from the longest recording mark.

4. An optical recording method for recording information on a phase-change optical recording medium which is recordable at a low-linear-velocity and a high-linear-velocity greater than the low-linear-velocity, the optical recording method comprising the steps of:

determining a ratio (Pel/Pwl) of an erasing power Pel to a recording power Pwl in the low-linear-velocity recording and a ratio (Peh/Pwh) of an erasing power Peh to a recording power Pwh in the high-linear-velocity recording so that the ratio (Pel/Pwl) and the ratio (Peh/Pwh) satisfy the relationship {(Pel/Pwl)< (Peh/Pwh)};

recording information on the phase-change optical recording medium and/or erasing information recorded on the phase-change optical recording medium by causing a change of phase in a recording layer of the phase-change optical recording medium by projecting a light beam onto the phase-change optical recording medium according to the recording power and the erasing power determined in the determining step; and setting an Asymmetry (Asym) in the low-linear-velocity recording so that the Asymmetry (Asyml) in the low-linear-velocity recording satisfies the relationship (Asyml≦−3.0), where the Asymmetry (Asym) is a characteristic value defined by the following equation;

$$\text{Asym}=[(3T_H+3T_L)/2-(11T_H+11T_L)/2]\div(11T_H-11T_L)$$

where $3T_H$ is a maximum value of an amplitude of a reproduction signal obtained from a shortest recording mark, $3T_L$ is a minimum value of an amplitude of the reproduction signal obtained from the shortest recording mark, $11T_H$ is a maximum value of an amplitude of a reproduction signal obtained from a longest recording mark, $11T_L$ is a minimum value of an amplitude of the reproduction signal obtained from the longest recording mark.

5. An optical recording method for recording information on a phase-change optical recording medium which is recordable at a low-linear-velocity and a high-linear-velocity greater than the low-linear-velocity, the optical recording method comprising the steps of:

determining a ratio (Pel/Pwl) of an erasing power Pel to a recording power Pwl in the low-linear-velocity recording and a ratio (Peh/Pwh) of an erasing power Peh to a recording power Pwh in the high-linear-velocity recording so that the ratio (Pel/Pwl) and the ratio (Peh/Pwh) satisfy the relationship {(Pel/Pwl)< (Peh/Pwh)};

recording information on the phase-change optical recording medium and/or erasing information recorded on the phase-change optical recording medium by causing a change of phase in a recording layer of the phase-change optical recording medium by projecting a light beam onto the phase-change optical recording medium according to the recording power and the erasing power determined in the determining step; and further determining the erasing power Pel and the recording power Pwl in the low-linear-velocity recording and the erasing power Peh and the recording power Pwh in the high-linear-velocity recording so that a difference (Pwl−Pel) and a difference (Pwh−Peh) satisfy the relationship {(Pwl−Pel)>(Pwh−Peh)}; and wherein the step of further determining includes the step of determining the erasing power Pel and the recording power Pwl in the low-linear-velocity recording and the erasing power Peh and the recording power Pwh in the high-linear-velocity recording so that the difference (Pwl−Pel) and the difference (Pwh−Peh) satisfy the relationship {(Pwl−Pel)=C×(Pwh−Peh)}, where C≧1.1.

6. An optical recording method for recording information on a phase-change optical recording medium which is recordable at a low-linear-velocity and a high-linear-velocity greater than the low-linear velocity, the optical recording method comprising the steps of:

determining a ratio (Pel/Pwl) of an erasing power Pel to a recording power Pwl in the low-linear-velocity recording and a ratio (Peh/Pwh) of an erasing power Peh to a recording power Pwh in the high-linear-velocity recording so that the ratio (Pel/Pwl) and the ratio (Peh/Pwh) satisfy the relationship {(Pel/Pwl)< (Peh/Pwh)};

recording information on the phase-change optical recording medium and/or erasing information recorded on the phase-change optical recording medium by causing a change of phase in a recording layer of the phase-change optical recording medium by projecting a light beam onto the phase-change optical recording medium according to the recording power and the erasing power determined in the determining step; and further determining the erasing power Pel and the recording power Pwl in the low-linear-velocity recording and the erasing power Peh and the recording power Pwh in the high-linear-velocity recording so that a difference (Pwl−Pel) and a difference (Pwh−Peh) satisfy the relationship of {(Pwl−Pel)>(Pwh−Peh)};and wherein the step of further determining includes the step of setting the difference (Pwl−Pel) to be equal to or greater than 7.2 mW.

7. An optical recording method for recording information on a phase-change optical recording medium which is recordable at a low-linear-velocity and a high-linear-velocity greater than the low-linear-velocity, the optical recording method comprising the steps of:

determining a ratio (Pel/Pwl) of an erasing power Pel to a Pel to a recording power Pwl in the low-linear-velocity recording and a ratio (Peh/Pwh) of an erasing power Peh to a recording power Pwh in the high-linear-velocity recording so that the ratio (Pel/Pwl) and the ratio (Peh/Pwh) satisfy the relationship {(Pel/Pwl)< (Peh/Pwh)};and recording information on the phase-change optical recording medium and/or erasing information recorded on the phase-change optical recording medium by causing a change of phase in a recording layer of the phase-change optical recording medium by projecting a light beam onto the phase-change optical recording medium according to the recording power and the erasing power determined in the determining step; and wherein a recording layer of said phase-change optical recording medium contains Ag, In, Sb, Te and N or O, and respective composition ratios α, β, γ, δ and ε of the elements satisfy the following relationships;

$0<\alpha\leq6, 3\leq\beta\leq15, 50\leq\gamma\leq65,$ $20\leq\delta\leq35, 0\leq\epsilon\leq10$ $\alpha+\beta+\gamma+\delta+\epsilon\leq100.$ 8. An optical recording method for recording information, said optical recording method comprising the steps of:

providing a phase-change optical recording medium which is recordable at a low-linear-velocity and a high-linear-velocity greater than the low-linear-velocity;

providing a recording apparatus for recording information on said phase-change optical recording medium and for erasing information recorded on said phase-change optical recording medium, said apparatus being operable at said low-linear-velocity and at said high-linear-velocity;

providing power setting for said recording apparatus such that said apparatus generates a first erasing power (Pel) and a first recording power (Pwl) for said low-liner-velocity, and a second erasing power (Peh) and a second recording power (Pwh) for said high-linear-velocity, wherein the ratio (Pel/Pwl) of said first erasing power (Pel) to said first recording power (Pwl) is less than the ratio (Peh/Pwh) of said second erasing power (Peh) to said second recording power (Pwh);

subsequently, selecting one of said low-linear-velocity and said high-linear-velocity; and subsequently, operating said recording apparatus at said selected velocity and corresponding power settings.

9. The optical recording method as claimed in claim 8, wherein a difference (Pwl−Pel) and a difference (Pwh−Peh) satisfy the relationship {(Pwl−Pel)>(Pwh−Peh)}.

10. The optical recording method as claimed in claim 8, further including the step of providing a residual heat adjusting pulse for applying a residual heat adjusting power smaller than the erasing power Pel in the low-linear-velocity recording, the residual heat adjusting pulse preceding a front pulse according to a recording strategy for applying the recording power Pwl so as to record a recording mark.

11. The optical recording method as claimed in claim 8, further including the step of setting the low linear velocity to 1.2 m/s to 1.4 m/s and setting the high linear velocity equal to or more than 2.4 m/s.

12. The optical recording method as claimed in claim 8, wherein the difference between said first recording power and said first erasing power (Pwl−Pel) is equal to or greater than 7.2 mW.

13. The optical recording method as claimed in claim 8, wherein a recording layer of said phase-change optical recording medium contains Ag, In, Sb, Te and N or O, and respective composition ratio $\alpha$, $\beta$, $\gamma$, $\delta$ and $\epsilon$ of the elements satisfy the following relationships;

$$0<\alpha\leq 6, 3\leq\beta\leq 15, 50\leq\gamma\leq 65,$$

$$20\leq\delta\leq 35, 0\leq\epsilon\leq 10$$

$$\alpha+\beta+\gamma+\delta+\epsilon\leq 100.$$

* * * * *